May 7, 1929. C. H. SCHURR 1,712,095
MACHINE AND METHOD FOR PROFILING GEAR TEETH
Filed Aug. 11, 1927 2 Sheets-Sheet 1

INVENTOR
Charles H. Schurr
BY Harry R. Canfield
ATTORNEY

Patented May 7, 1929.

1,712,095

UNITED STATES PATENT OFFICE.

CHARLES H. SCHURR, OF CLEVELAND, OHIO, ASSIGNOR TO THE LEES-BRADNER COMPANY, OF CLEVELAND, OHIO, A CORPORATION OF OHIO.

MACHINE AND METHOD FOR PROFILING GEAR TEETH.

Application filed August 11, 1927. Serial No. 212,156.

This invention relates to toothed gears.

More particularly it relates to profiling and finishing the teeth of gears which have been roughed-out or otherwise produced by a preceding operation, such for example as by hobbing.

Gears are commonly made according to some geometric system, such for example as the involute system; and accordingly have tooth profiles conforming to a known curve, for example the involute. It is sometimes desirable however to produce gear teeth the working face profiles of which are not of true involute curvature, although following the general direction of the involute, but which deviate from the true involute by pre-selected amounts at pre-selected points. Such profiles may for convenience be referred to as modified profiles and the profile curves thereof as modified involutes.

It is one of the objects of this invention to provide a method and means for profiling and finishing the working faces of gear teeth by which modified profiles of various pre-selected character may be produced; that is, may be made to conform to any one of a variety of curves for example: a curve composed of two or more sections each of which is a segment of some involute; or a curve composed of two or more sections one or more of which is a segment of an involute and another of which is of non-involute curvature; or a curve approximating an involute but composed of one or more sections each of which is a segment of a non-involute curve.

Another object of this invention is to provide a method and machine by which gear teeth may be given pre-selected modified profiles of a high degree of uniformity and accuracy, as to curvature and as to spacing around the gear and as to concentricity; and at a rapid rate of production; and by which the surfaces of the working faces may be made dense and smooth.

Another object of this invention is to provide a method for producing modified profiles of various pre-selected curvature in which the operation of profiling and finishing the gear teeth faces may be effected by displacing and redistributing the material of the roughed-out tooth faces in a manner and by a means similar to that disclosed in my Patent No. 1,642,179, patented September 13, 1927.

In the accompanying drawing, Fig. 1 is a sectional view of one form of an apparatus for carrying out my invention, taken approximately from the plane 1—1 of Fig. 2, some of the parts back of the sectional plane being omitted for clearness, and the view being diagrammatic in some respects;

Figure 2:
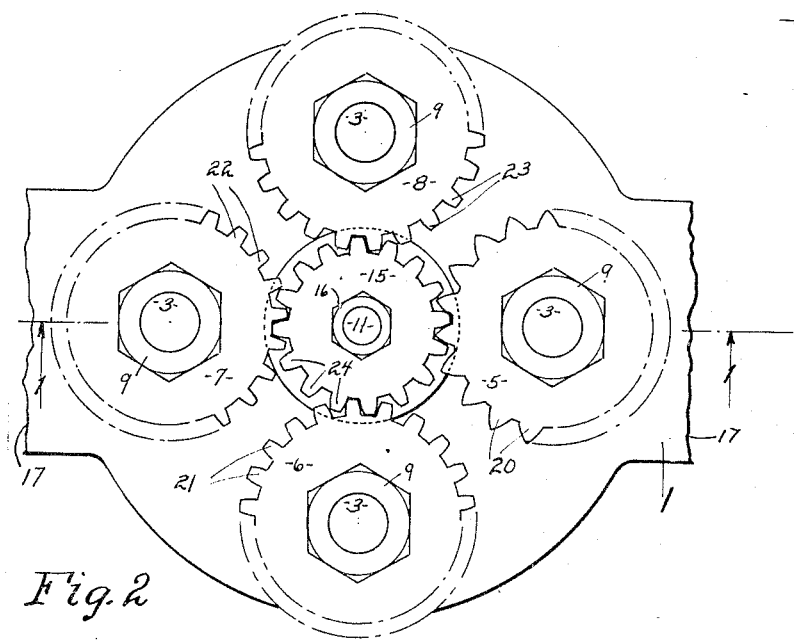
Fig. 2 is a top plan view of the apparatus of Fig. 1.
Figure 5:
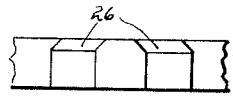
Fig. 5 is a view taken from the plane 5 of Fig. 4.
Figure 6:
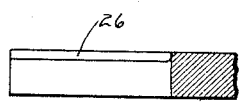
Fig. 6 is a view taken from the plane 6 of Fig. 4.
Figure 1:
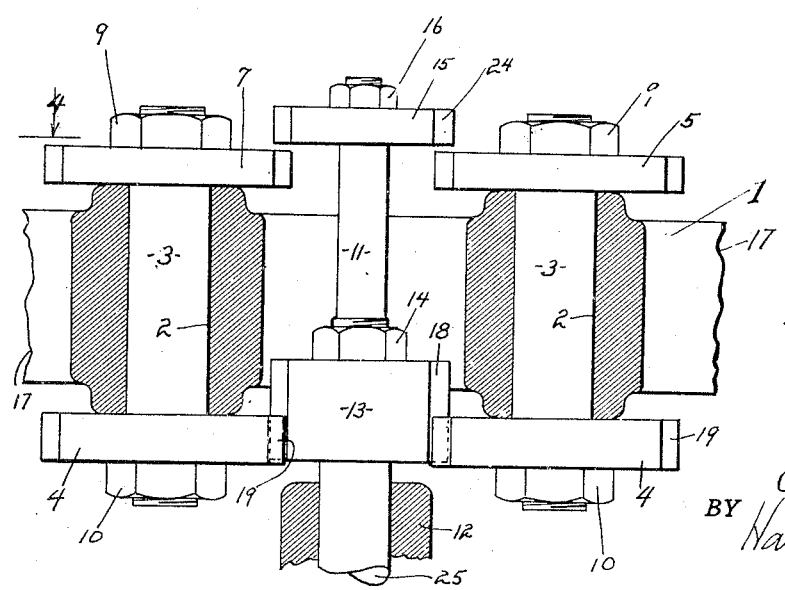

Referring to Figs. 1 and 2 I show at 1 an annular frame having bores 2—2 in which are rotatably mounted tool spindles 3 having on the lower ends thereof gears 4; and having on the upper ends thereof tools 5, 6, 7 and 8 to be more fully described later. The gears and tools are rigidly secured upon the spindles 3 by upper nuts 9 and lower nuts 10.

A central work spindle 11 is rotatably mounted in a bearing 12 and carries a driving gear 13 rigidly secured thereon by a nut 14 and adapted to mesh with and drive the gears 4; and on its upper end, the spindle 11 carries a work gear 15 rigidly secured thereon by a nut 16.

Means not shown is intended to be applied to the annular frame 1 as at the broken off portions 17 thereof to move the frame 1 upwardly and downwardly (as viewed in Fig. 1) so that the gears 4 and the tools 5, 6, 7 and 8 on the tool spindles 3 may be given axial movement relative respectively to the gear 13 and work gear 15 on the work spindle 11. If preferred, the frame 1 may be held stationary and the work spindle 11 moved upwardly and downwardly (as viewed in Fig. 1) in the direction of its axis. The driving gear 13 and the driven gears 4 are accurately made gears and have accurately made teeth, and the teeth 18 of the gear 13 are made relatively long, in the axial direction, so that when the gears 4 and 13 are given relative axial movement the teeth 19 of the gears 4 remain always in mesh with the teeth 18 of the gear 13. The tools 5, 6, 7 and 8 to be more fully described have teeth 20, 21, 22 and 23 respectively which may be meshed with the teeth 24 of the work gear 15 or may be withdrawn entirely out of mesh therewith by the relative axial movement above referred to.

The tools 5, 6, 7 and 8 and the work gear 15 are secured on their respective spindles in such rotated positions about their axes that all of the tools will mesh with the work gear when the gears 4 and 13 are meshed. Means not shown is provided for applying power at 25 to the work spindle 11 to rotate it and as will now be understood this will cause the gear 13 to drive the gears 4 and turn the tool spindles 3 and the tools 5, 6, 7 and 8 in unison therewith, and will also rotate the work gear 15 so that its teeth will mesh with the teeth of the rotating tools. The tools 5, 6, 7 and 8 and the work gear 15 do not drive each other but are preferably fixed upon their respective spindles in such rotative positions about their respective axes that when the meshed gears 4 and 13 which are also secured to the same spindles rotate, the tools and work gear are thereby caused to rotate with the same relative movement as the gears 4 and 13. The pitch circles of the tools and work gear are determined by the pitch circles of the gears 4 and 13 respectively.

For purposes to be described the annular frame 1 is rigid in itself and is rigidly supported at 17 against lateral movement and if desired the bearing 12 may be supported in a rigid manner against lateral movement so that the axes of the work spindle 11 and the tool spindles 3 are maintained at fixed radial distances from each other.

Figure 7:
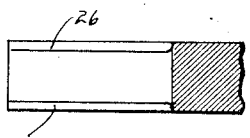
Fig. 7 is a view similar to Fig. 6 showing a modification.

The tools 5, 6, 7 and 8 are in substance and effect accurately made gears having accurate tooth profiles and tooth spacing. The upper ends of the tool teeth (as viewed in Fig. 1) are preferably chamfered along the curved edges which are formed by the intersection of the tooth faces with the gear face as clearly shown at 26 in Figs. 4 to 7 inclusive. The lower ends also of the teeth may if desired be chamfered as shown at 27 in Fig. 7. To simplify the drawing, these chamfers are omitted from the other figures (as are also some of the teeth of the tools). The tools are preferably made harder than the gear to be worked. The chamfer 26 may be modified in various ways or may be omitted as disclosed in my said above-mentioned patent.

The operation of the machine as thus far described is as follows:

With the parts in the positions shown in Figs. 1 and 2 the spindles are rotated as above described, preferably at a high rate of speed and while so rotating the work spindle 11 and spindles 3 are moved axially relatively as for example by moving the annular frame 1 upwardly as viewed in Fig. 1. The tool teeth will thus be moved to enter the roughed-out tooth spaces of the work gear 15, the chamfered portions 26 of the tool teeth entering the tooth spaces first. The accurate teeth faces of the tools 5, 6, 7 and 8 are of the correct size to mesh (as with conjugate gear teeth) with the faces of the teeth 24 of the work gear 15 after they will have been profiled or finished; but in as much as the teeth 24 have only been roughed-out, the tooth spaces are slightly smaller than their finished size-to-be and therefore as the tools 5, 6, 7 and 8 advance axially into the tooth spaces of the work gear 15, the teeth of the tools displace and redistribute the metal composing the faces of the work gear teeth. The action of the tool may for convenience be termed an "ironing operation." This action is discussed in detail in my patent above referred to and it is deemed unnecessary to add to the length of the present disclosure by discussing it here. Suffice it to say that the teeth of the tools 5, 6, 7 and 8 being accurate and uniform as to profile, spacing and concentricity, the faces which they leave on the teeth of the work gear will be correspondingly accurate as to profile, spacing and concentricity, and the surfaces will be made dense and smooth. It may be noted that the relative movement of the tools and the work gear being concurrently around the gear and axially thereof, the general path of each tool with respect to the work gear is a helix. The tool may be passed axially over the faces of the work gear teeth in one direction or in both directions; and once or several times.

Obviously the reworking of the material of the gear tooth faces by the tool teeth to finish and profile them as above described will cause the tools to produce on the work gear tooth faces profiles the particular curvature of which will bear a definite relation to the curvature of the tool teeth producing them. If the tool teeth profiles be involutes, then the tool teeth will produce involute profiles on the work gear teeth which will be at the same normal pitch as the involutes of the tool and which will engage the involutes of the tool at a pressure angle predetermined by the pitch diameter on which the tool runs, which in turn may be pre-selected by pre-selecting the pitch diameters of the gears 13 and 4. This follows from the well known geometry of involute gears.

Figure 8:
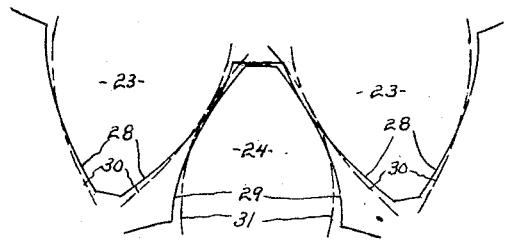
Fig. 8 is a view drawn to a larger scale of a portion of Fig. 2 and showing a gear tooth and tool teeth engaged as in the operation of my invention.

Referring to Fig. 8, if the tool teeth 23 have involute profiles represented by the solid lines 28, they will work involute profiles on the teeth 24 of the gear which will be represented by the solid lines 29. If the involute profiles of the tool teeth 23 are such as would be represented by the broken lines 30, having as indicated, greater normal pitch and smaller pressure angle than the solid line involutes 28, they will produce on the work gear teeth 24 involute profiles correspondingly of greater normal pitch and smaller pressure angle such as are represented by the broken line curves 31.

*Modified profiles made by involute tool teeth.*

Figure 3:
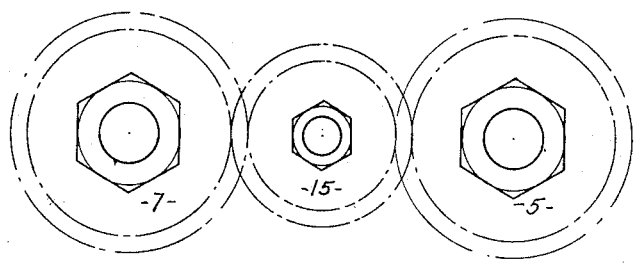
Fig. 3 is a view similar to Fig. 2 showing a modified form and with the view simplified.
Figure 4:
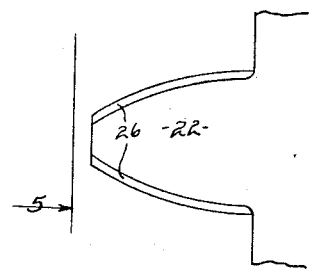
Fig. 4 is a view taken from the plane 4 of Fig. 1 and drawn to a larger scale.
Figure 9:
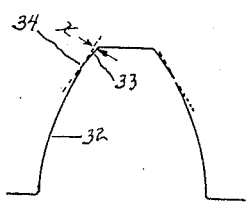
Fig. 9 is a view showing a modified involute gear tooth profile made according to my invention.

We come now to a consideration of modified profiles which may be produced by my invention. One form of modified profile which may be made is illustrated in Fig. 9. It conforms to a curve composed of two sections 32 and 33 each of which is a segment of an involute. The two involutes join at 34, one intersecting the other as is shown by extending them beyond the intersection in dotted lines. Two tools are employed one differing from the other in normal pitch or normal pitch and pressure angle. The arrangement of the tools for producing this profile is preferably that indicated in Fig. 3, the tool 5 producing the involute 33 and the tool 7 producing the involute 32. But of course, it will be understood that the arrangement in Fig. 2 could be employed in which case any two of the tools could produce one of the involutes and the other two the other involute; or three of the tools could produce one involute, and the remaining tool produce the other involute.

Figure 10:
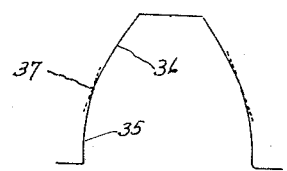
Fig. 10 is a view similar to Fig. 9 showing a modification.
Figure 11:
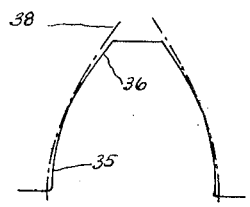
Fig. 11 is a view similar to Fig. 10 analyzing the gear tooth profile thereof.

In Fig. 10 is shown a modification of the profile of Fig. 9, in which the resulting profile is composed of two involute segments 35 and 36 more nearly equal in length on the face of the tooth than in Fig. 9; and the intersection occurring at a point 37 more nearly midway of the length of the tooth. Either of the involute segments 35 or 36 may be considered as the main involute of the tooth and the other involute segment may be considered as a modifying portion joined thereto; or both of the involutes 35 and 36 may be considered as superimposed upon a hypothetical involute 38 Fig. 11, with relation to which the involute segment 36 is of smaller normal pitch and the segment 35 is of greater normal pitch.

Figure 12:
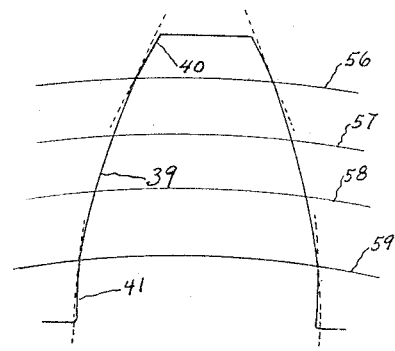
Fig. 12 is a view showing another form of modified involute gear tooth profile.

In Fig. 12 is shown a form of modified profile in which the profile curve is composed of a plurality of involute segments, three being illustrated. This profile is preferably considered as composed of a main involute 39 joined near the tip of the tooth by another involute 40, and near the root of the tooth by another involute 41. This profile is preferably made by the arrangement shown in Fig. 2 in which the tools 6 and 8 make the involute 39 and the tools 5 and 7 respectively make the involutes 40 and 41.

When more than one tool works upon the same involute, such as the tools 6 and 8 on the involute 39 as just mentioned, it may be desired to have each tool work on a different pitch circle of the work gear in order to distribute the working action more uniformly, since, as more fully described in the above mentioned patent, the action of the tool is slightly less effective at the pitch circle than on either side of it. Therefore, as an illustrative example, the profile of Fig. 12 is preferably made with the tool 5 working on the pitch circle 56, the tool 6 on the pitch circle 57, the tool 8 on the pitch circle 58, and the tool 7 on the pitch circle 59.

Obviously a variety of modified involute profiles besides those shown, consisting of various combinations of segments of involutes and produced by two or more tools in various arrangements, may be made from the above disclosure without further description.

*Modified involutes made with noninvolute tools.*

Figure 13:
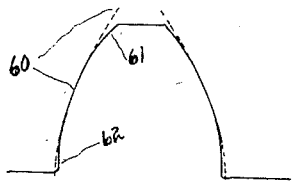
Fig. 13 is a view showing still another form of modified involute gear tooth profile.
Figure 14:
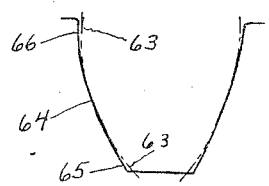
Fig. 14 is a view of a tool tooth for making the modified profile of Fig. 13.

In Fig. 13 I show a modified profile composed of a segment of an involute curve 60, and and two non-involute curve sections 61 and 62 the latter curves not intersecting but merging into the segment 60. Such a profile may be made by employing a tool such as illustrated in Fig. 14. The broken line curve 63 in Fig. 14 is an involute drawn for reference purposes. The solid line profile curve 64 of the tool tooth is seen to lie outside of the involute 63 at the outer and inner ends of the tooth, merging into the portions 65 and 66 of non-involute form. The profile 64 of the tool tooth is therefore itself a modified involute. As was described in connection with Fig. 8, an involute on the tool tooth will produce an involute on the work gear tooth; therefore it is obvious that if the profile of the tool tooth is an involute at the middle, and at the outer and inner ends lies outside of the involute, the profile on the work gear tooth, which such a tool tooth will produce will be an involute at the middle and at the outer and inner ends will lie inside of the involute; for example as illustrated in Fig. 13.

The modified profile of Fig. 13 as described is made by one or more tools all alike; but it may also be made by a number of different tools. In such case one or more of the tools would produce the involute section 60 and one or more other tools would produce the merging non-involute sections 61 and 62.

If desired a work gear tooth profile conforming to a curve which follows in general the path of an involute but no portion of which exactly conforms to an involute, may be produced by a tool tooth which, correspondingly, does not conform exactly to an involute at any portion.

Any known and suitable method may be employed to produce the required tooth profiles for the tools described hereinbefore. To produce involute tool teeth profiles I prefer to employ a generating gear grinder, for example such as that disclosed in my pending application Serial No. 141,707, filed October 15, 1926. For making non-involute or modified involute tool teeth profiles I preferably employ a generating gear grinder of the type disclosed in my pending application Serial No. 209,216, filed July 29, 1927. Another method of producing non-involute tool teeth profiles is to employ the hereinbefore described method using involute tools to produce a tool having profiles, say like that of Fig. 12; then to employ the tool thus made (like Fig. 12) to produce a second tool, the profiles of which are conjugate to the profiles of Fig. 12. The second tool thus made would have a modified non-involute profile and if used as a tool would produce work gear teeth having profiles like Fig. 12.

The maximum amount of departure or deviation from the true involute (to illustrate the amount $x$ in Fig. 9) may be varied as desired. This amount $x$ is greatly magnified in the drawing for illustrative purposes and in practice may be of the order of one ten thousandth of an inch. It will be apparent that the smaller is $x$, the greater will be the angle between two intersecting involutes, such as for example the two involutes 32 and 33 intersecting at 34 in Fig. 9, and the more nearly will the two involutes merge into each other. When $x$ is very small the two involutes for all practical purposes do merge into each other and the curve of the profile composed of two or more involutes is for all practical purposes a continuous gradual curve.

While I have described my invention as applied to a gear system the geometrical base of which is the involute, it will be understood that my invention is applicable to other gear systems such as for example the system in which the geometrical base is the cycloid.

When employing a plurality of tools to produce the gear tooth profiles, the gear is preferably worked as described by all of the tools in a single machine and by a single operation; and to perform one operation on the gear by one or more tools, in a machine and then to perform another operation by one or more other tools in another machine or in the same machine successively, is understood to be the equivalent thereof.

I claim:

1. The method of producing on a gear, tooth profiles of modified involute curvature, which includes roughing out the teeth of the gear to a preselected profile curvature, meshing the gear with a tool of gear form, relatively rotating the gear and tool, the tool having tooth profiles of such curvature that the tool tends to rotate with the gear at variable relative velocity, and forcing the gear and tool to rotate at uniform relative velocity by means external to the gear and tool.

2. The method of producing on a gear, tooth profiles of modified involute curvature, which includes roughing out the teeth of the gear to a preselected profile curvature, meshing the gear with a tool of gear form, relatively rotating the gear and tool, the tooth profiles of the tool terminating longitudinally of the teeth in working edges and being of such curvature that the tool tends to rotate with the gear at variable relative velocity, forcing the gear and tool to rotate at uniform relative velocity by means external to the gear and tool, and moving the gear and tool relatively in the longitudinal direction of the gear teeth to effect an ironing operation on the gear tooth faces by the working edges of the tool teeth.

3. The method of producing on a gear, tooth profiles of modified involute curvature, which includes roughing out the teeth of the gear to a preselected profile curvature, meshing the gear with a tool of gear form, relatively rotating the gear and tool, the tooth profiles of the tool terminating longitudinally of the teeth in chamfered working edges and being of such curvature that the tool tends to rotate with the gear at variable relative velocity, forcing the gear and tool to rotate at uniform relative velocity by means external to the gear and tool, and moving the gear and tool relatively in the longitudinal direction of the gear teeth to effect an ironing operation on the gear tooth faces by the chamfered working edges of the tool teeth.

4. In a machine of the class described, a work spindle adapted to support a work gear, a tool spindle, a tool of gear form on the tool spindle adapted to mesh with and relatively rotate with the work gear, the tool being provided with teeth the profile curvature of which is such that the tool and gear when relatively rotated tend to rotate at variable relative velocity, means for relatively rotating the tool and gear and means external to the gear and tool for forcing them to rotate at uniform relative velocity.

5. In a machine of the class described, a work spindle adapted to support a work gear, a tool spindle, a tool of gear form on the tool spindle adapted to mesh with and relatively rotate with the work gear, the tool being provided with teeth the profiles of which terminate longitudinally of the teeth in working edges and which profiles are of such curvature that the tool and gear when relatively rotated tend to rotate at variable relative velocity, means for relatively rotating the tool and gear, means external to the gear and tool for forcing them to rotate at uniform relative velocity and means for moving the gear and tool relatively in the longitudinal direction of the gear teeth to effect an ironing operation on the gear tooth faces by the working edges of the tool teeth.

6. In a machine of the class described, a work spindle adapted to support a work gear, a tool spindle, a tool of gear form on the tool spindle adapted to mesh with and relatively rotate with the work gear, the tool being provided with teeth the profiles of which terminate longitudinally of the teeth in chamfered working edges and which profiles are of such curvature that the tool and gear when relatively rotated tend to rotate at variable relative velocity, means for relatively rotating the tool and gear, means external to the gear and tool for forcing them to rotate at uniform relative velocity and means for moving the gear and tool relatively in the longitudinal direction of the gear teeth to effect an ironing operation on the gear tooth faces by the chamfered working edges of the tool teeth.

7. In a machine of the class described, a work spindle adapted to support a work gear, a tool spindle, a tool of gear form on the tool spindle adapted to mesh with and relatively rotate with the work gear, the tool being provided with teeth the profile curvature of which is such that the tool and gear when relatively rotated tend to rotate at variable relative velocity, means for relatively rotating the tool and work gear, a master gear on the work spindle and a master gear on the tool spindle meshed therewith and adapted to rotate therewith at uniform relative velocity whereby the work gear and tool are forced to rotate at uniform relative velocity.

8. In a machine of the class described, a work spindle adapted to support a work gear, a tool spindle, a tool of gear form on the tool spindle adapted to mesh with and relatively rotate with the work gear, the tool being provided with teeth the profiles of which terminate longitudinally of the teeth in working edges and which profiles have such curvature that the tool and gear when relatively rotated tend to rotate at variable relative velocity, means for relatively rotating the tool and work gear, a master gear on the work spindle and a master gear on the tool spindle meshed therewith and adapted to rotate therewith at uniform relative velocity whereby the work gear and tool are forced to rotate at uniform relative velocity, and means for moving the gear and tool relatively in the longitudinal direction of the gear teeth to effect an ironing operation on the gear tooth faces by the working edges of the tool teeth.

9. In a machine of the class described, a work spindle adapted to support a work gear, a tool spindle, a tool of gear form on the tool spindle adapted to mesh with and relatively rotate with the work gear, the tool being provided with teeth the profiles of which terminate longitudinally of the teeth in chamfered working edges and which profiles have such curvature that the tool and gear when relatively rotated tend to rotate at variable relative velocity, means for relatively rotating the tool and work gear, a master gear on the work spindle and a master gear on the tool spindle meshed therewith and adapted to rotate therewith at uniform relative velocity whereby the work gear and tool are forced to rotate at uniform relative velocity, and means for moving the gear and tool relatively in the longitudinal direction of the gear teeth to effect an ironing operation on the gear tooth faces by the chamfered working edges of the tool teeth.

10. In a machine of the class described, a work spindle adapted to support a work gear, a plurality of tool spindles, a tool of gear form on each tool spindle adapted to mesh simultaneously with and relatively rotate with the work gear, the tools being provided with teeth the profile curvature of some of which is such that when the gear and tools are rotated relatively the gear and some of the tools tend to rotate at variable relative velocities, means for relatively rotating the tools and gear and means external to the tools and gear for forcing all of them to rotate at uniform relative velocities.

11. In a machine of the class described, a work spindle adapted to support a work gear, a plurality of tool spindles, a tool of gear form on each tool spindle adapted to mesh simultaneously with and relatively rotate with the work gear, the tools being provided with teeth the profiles of which terminate longitudinally of the teeth in working edges and the profile curvature of some of which teeth is such that when the gear and tools are relatively rotated the gear and some of the tools tend to rotate at variable relative velocities, means for relatively rotating the tools and gear, means external to the gear and tools for forcing all of them to rotate at uniform relative velocities and means for moving the gear and tools relatively in the longitudinal direction of the gear teeth to effect an ironing operation on the gear tooth faces by the working edges of the tool teeth.

12. In a machine of the class described, a work spindle adapted to support a work gear, a plurality of tool spindles, a tool of gear form on each tool spindle adapted to mesh simultaneously with and relatively rotate with the work gear, the tools being provided with teeth the profile curvature of some of which is such that when the gear and tools are relatively rotated the gear and some of the tools tend to rotate at variable relative velocities, means for relatively rotating the tools and gear, a master gear on the work spindle and a master gear on each of the tool spindles meshed therewith and adapted to rotate therewith at uniform relative velocities whereby the work gear and all of the tools are forced to rotate at uniform relative velocities.

13. In a machine of the class described, a work spindle adapted to support a work gear, a plurality of tool spindles, a tool of gear form on each of the tool spindles adapted to mesh simultaneously with and relatively rotate with the work gear, the tools being provided with teeth the profiles of which terminate longitudinally of the teeth in working edges and the profile curvature of some of which teeth is such that when the gear and tools are relatively rotated the gear and some of the tools tend to rotate at variable relative velocities, means for relatively rotating the tools and gear, a master gear on the work spindle and a master gear on each of the tool spindles meshed therewith and adapted to rotate therewith at uniform relative velocities whereby the work gear and all of the tools are forced to rotate at uniform relative velocities, and means for moving the gear and tools relatively in the longitudinal direction of the gear teeth to effect an ironing operation on the gear tooth faces by the working edges of the tool teeth.

In testimony whereof, I have hereunto signed my name.

CHARLES H. SCHURR.